3,208,820
PROCESS FOR REGENERATING SILVER
SALT SOLUTIONS
Ulrich Schwenk, Frankfurt am Main, Ludwig Schläfer, Sulzbach, Taunus, Günter Mau and Manfred Förderreuther, Frankfurt am Main, and Fritz Hübenett, Wiesbaden, Germany, assignors to Farbwerke Hoechst Aktiengesellschaft vormals Meister Lucius & Brüning, Frankfurt am Main, Germany, a corporation of Germany
No Drawing. Filed Oct. 9, 1961, Ser. No. 143,533
Claims priority, application Germany, Oct. 11, 1960, F 32,309
8 Claims. (Cl. 23—50)

The present invention relates to a process for regenerating silver salt solutions.

It is known that acetylene hydrocarbons, especially acetylene react with silver ions to form very explosive silver acetylides. In German Patent, 1,027,658, disclosing isolation of olefins from olefin-containing gases by absorption in silver salt solutions, it is recommended to remove traces of acetylenes included in these gases by previous partial hydrogenation in order to avoid accumulation of relatively great amounts of acetylides in the silver salt solution. This must be done as silver acetylides partially dissolve in concentrated silver salt solutions before they are being precipitated as solid silver acetylides. In other words, the presence of silver acetylides in those solutions does not immediately manifest itself in the formation of a precipitate.

It is known that silver salt solutions are used for selectively absorbing olefins from gas mixtures. The gas mixtures subjected to such absorption always contain impurities which enrich in the absorption solution and imply its regeneration. These impurities which may be either soluble or insoluble in the silver salt solutions include the acetylene hydrocarbons, more especially acetylene, its dimers and the mono-alkyl derivatives of these hydrocarbons, which react with the silver salt solution to form silver acetylides, and other unsaturated hydrocarbons, primarily poly-unsaturated hydrocarbons, that form polymers in the solution.

We have now found that silver acetylides and resinous substances formed from polymerized olefinic hydrocarbons or their derivatives can be removed from aqueous silver salt solutions and the latter regenerated by subjecting these solutions to thermal treatment at a temperature of at least 50° C.

During that treatment, metallic silver separates from the solution under mild conditions while silver acetylides included in the solution disappear simultaneously as can readily be proved by physical or chemical means. At the same time, non-volatile organic substances, if any, which may have been formed by side-reactions, such as foam-forming substances or polymers, are removed together with the silver acetylides with separation of silver. The thermal treatment according to this invention removes from the solution, for example silver acetylides, silver methylacetylide, silver vinylacetylide, silver diacetylide and silver salts of mono-lower alkyl acetylenes, such as ethyl acetylene, propyl acetylene or butyl acetylene, resins and polymers which may have been formed from olefinic hydrocarbons such as butadiene, isoprene, chloroprene or allene and have accumulated or precipitated in said solution.

The silver separated can readily be redissolved using an oxidizing agent, preferably hydrogen peroxide.

In order to avoid that during the thermal treatment more silver than corresponds to the decomposition of the silver acetylides is separated, the silver salt solution to be regenerated is freed before or during thermal treatment from volatile organic ingredients by stripping with steam or a gas inert towards the silver salt solution, such as nitrogen, noble gases or carbon dioxide. Stripping is advantageously carried out at a raised temperature, preferably at the boiling temperature of the silver salt solution and, if desired, under reduced pressure.

As mentioned above, the silver salt solution is subjected to the heat treatment according to this invention at a temperaure above 50° C., especially above 100° C. and more especially between 150 and 200° C. and, if desired under pressure, preferably that pressure which corresponds to the vapor pressure of the solution at its boiling point.

The heat treatment should be carried out until the desired low proportion of acetylides in the solution has been obtained. The time of treatment depends on the temperature used and the initial respectively desired concentration of the acetylides in the solution. The time of treatment is the shorter the higher the temperature, the lower the initial concentration and the higher the admissible final concentration of silver acetylides in the silver salt solution. In view of all these factors, the treatment may be carried out for a period of between 1 minute up to 10 hours. The conditions advantageously should be so selected that the heat treatment is complete within less than 1 hour. Under conditions desirable from a technological point of view, for example at relatively high temperatures and with not too high a concentration of acetylides in the solution, the treatment will generally be completed within a period of some minutes up to ¼ hour.

In order to accelerate the decomposition of silver acetylides, the thermal treatment may be carried out in the presence of an oxidizing agent, for example air, oxygen, ozone, hydrogen peroxide, oxidizing nitrogen-oxygen acids or oxidizing nitrogen oxides, such as $NO$, $NO_2$, $N_2O_3$, $N_2O_4$, $N_2O_5$, dilute, concentrated or fuming nitric acid, nitrates or nitrites among which the water-soluble or more especially the alkali metal or alkaline earth metal nitrates or nitrites or the corresponding silver salts are preferred.

The thermal treatment may also be carried out by injecting the silver salt solution to be regenerated into a superheated gas current, advantageously a current of one of the above mentioned inert gases or steam, at atmospheric pressure or super-pressure and thus decomposing the impurities included in the solution. The current of gas should have a temperature of at least 100° C., preferably 150–250° C.

The process of this invention offers the advantage that a silver salt solution used for continuous ethylene absorption (cf. German Patent 1,027,658) may in part be removed (partial current) intermittently or continuously to decompose in the partial current branched off the acetylides and resinous impurities so that the content of dissolved silver acetylides in the bulk of the solution does not exceed a certain degree of saturation, preferably about 40%.

The time required for regeneration may be shortened and the regeneration temperature reduced to about 50 to 150° C. by adding to the silver salt solution before or during the heat treatment a solid oxidizing agent, such as alkali metal or silver permanganate or silver oxide, or by producing these agents intermediately in the solution during the heat treatment. When these solid oxidizing agents are used, it is advantageous to work at about 100° C., i.e., the boiling point of the solution under atmospheric pressure.

The aforesaid solid oxidizing agents may be intermediately produced, for example, using metallic silver as starting material which is transformed by means of molecular oxygen, e.g. in the form of air, pure oxygen or ozone into its oxide and which transmits its oxygen to the organic impurities.

When silver oxide is used, care must of course be taken to ensure that the silver salt solution contains less free acid than is necessary to dissolve the silver oxide.

The silver salt solutions which can be regenerated by the process of this invention include, for example, aqueous solutions of silver borofluoride, silver fluorosilicate, silver nitrate, silver perchlorate, silver fluoride, silver trifluoroacetate, silver antimony hexafluoride, silver arsenic hexafluoride or mixture of these salts.

The following examples serve to illustrate the invention, but they are not intended to limit it thereto, the parts and percentages are by weight unless otherwise stated:

Example 1

10 cc. of a silver borofluoride solution containing 6 g. dissolved silver were contacted with 50 cc. acetylene which dissolved without a precipitate being formed. After heating for 1 hour to 200° C. in an autoclave, silver had separated which was dissolved by adding the calculated amount $H_2O_2$. The silver salt solution so treated was substantially free from dissolved silver acetylides.

Example 2

A current of gas (composed of 20 parts by volume ethylene and 80 parts by volume ethane and containing 0.002% by volume acetylene) was washed at atmospheric pressure with a saturated silver nitrate solution and the ethylene was liberated from the silver nitrate solution by boiling under reduced pressure (20 mm. mercury).

A partial current of the silver nitrate solution was treated with steam and thus freed from traces of dissolved ethylene. Subsequently, the whole was heated at 200° C. while adding small amounts of nitric acid and maintained at that temperature until silver acetylide could no longer be detected. The hot solution was released to atmospheric pressure whereby oxidation products and nitrogen oxides were removed and the solution was returned to the wash process. The content of acetylene in the silver salt solution was thus maintained at less than 1 cc. gaseous acetylene per cc. solution.

Example 3

A gas composed of 30% by volume ethylene, 20% by volume propylene, 1% by volume acetylene, rest nitrogen was passed through a solution of silver borofluoride in concentrated hydro-fluoboric acid, containing 635 g. silver per liter. After 8 cc. acetylene had been absorbed per cc. silver salt solution, the solution was heated at 120° C. and boiled. After heating for 1 hour at that temperature, dissolved silver acetylide was no longer detectable. The silver which had precipitated in a minor proportion could be dissolved by adding the calculated amount of hydrogen peroxide.

Example 4

A silver borofluoride solution containing per liter 600 g. dissolved silver was used. 2 liters of that solution containing acetylide and soluble organic substances in a proportion which corresponded to a content of 6 liters acetylene and homologs thereof were admixed at 60° C. with an aqueous solution of 192 g. silver permanganate. The whole was thoroughly stirred and separated pyrolusite was filtered off. The acetylide had then substantially disappeared.

Example 5

A silver borofluoride solution containing per liter 750 g. dissolved silver (pH value of the solution: 4) was used for absorbing acetylene. 2 liters of such solution which had been neutralized with silver oxide and contained 4 liters acetylenic hydrocarbons in the form of bound acetylides, were mixed with 200 cc. of a silver catalyst containing 10% silver on silica gel. The whole was then gas-treated through a frit with 2 to 3 g. ozone/hour. After 5 hours, the acetylene content of the solution had dropped to less than 10% of the initial value.

Example 6

2 liters of the solution used in Example 5 and 300 g. silver oxide were kept for 2 hours at 110° C. while stirring well. The silver and silver oxide mixture in excess was removed by filtration. The content of acetylides in the solution had dropped to less than 5% of its initial value.

Example 7

A gas composed of about 80% by volume carbon monoxide, methane and hydrogen and about 20% by volume ethylene and containing in 1,000,000 parts by volume 100 parts by volume acetylene, was passed countercurrently through a silver boro-fluoride solution (cf. Example 5), the ethylene and acetylene being selectively absorbed. After ethylene removal in vacuo, by heating or stripping, the acetylide-containing silver salt solution was heated for 2 hours at 90° C. with an excess of silver oxide until the acetylide was completely destroyed by oxidation. The silver oxide in excess and the silver formed were then removed by suction-filtration. The filter residue was then dissolved with semi-concentrated nitric acid and the silver oxide was again precipitated by means of a sodium hydroxide solution. The silver oxide was washed and could then again be used for oxidizing acetylides.

Example 8

7 liters $AgBF_4$-solution were gas-treated under 5 atmospheres with 2 m.$^3$/h. of a $C_4$-hydrocarbon fraction (50% butylene, 42.5% butadiene, remainder $C_4$-paraffines). The pressure was reduced and the unsaturated hydrocarbons were thus liberated. After 24 hours of operation, the silver salt solution contained 4.6% C. The desorbed gases were analyzed and the loss of butadiene was determined with 15%. Heat treatment for 2 hours of the carbon-containing solution at 200° C. reduced C-content to 0.3 to 0.15%.

We claim:

1. In a process of selectively absorbing olefins from a gaseous mixture containing an olefin and an acetylenic impurity by an aqueous solution of a water-soluble silver salt of silver and an anion selected from the group consisting of borofluoride, fluorosilicate, nitrate, perchlorate, fluoride, trifluoroacetate, antimony hexafluoride, arsenic hexafluoride and mixtures thereof, said solution being contaminated with a dissolved silver acetylide selected from the group consisting of silver acetylide, silver lower alkyl acetylide, silver vinylacetylide and silver diacetylide formed by silver ions from said solution and an acetylenic impurity absorbed in said solution from said gaseous mixture and contaminated with an unsaturated polymer formed from polymerized olefinic hydrocarbons of 3 to 5 carbon atoms absorbed in said solution from said gaseous mixture, the steps of regenerating said aqueous solution which comprise heating said solution to a temperature above 100° C. to oxidize the acetylide of said silver acetylide, to oxidize said polymer and to reduce the silver of said silver acetylide to free silver whereby said contaminants are effectively converted to oxidation and reduction products, and oxidizing said free silver to silver ions to regenerate said solution.

2. The process of claim 1, wherein the solution is atomized into a super-heated gas stream.

3. A process as defined in claim 1 wherein volatile oxidation products of said silver acetylide and said polymer formed during regeneration of the solution are stripped therefrom by passing through the solution a gas inert thereto.

4. In a process of selectively absorbing olefins from a gaseous mixture containing an olefin and an acetylenic impurity by an aqueous solution of a water-soluble silver salt of silver and an anion selected from the group consisting of borofluoride, fluorosilicate, nitrate, perchlorate, fluoride, trifluoroacetate, antimony hexafluoride, arsenic hexafluoride and mixtures thereof, said solution being contaminated with a dissolved silver acetylide selected from the group consisting of silver acetylide, silver lower alkyl acetylide, silver vinylacetylide and silver diacetylide formed by silver ions from said solution and an acetylenic impurity absorbed in said solution from said gaseous mixture and contaminated with an unsaturated polymer formed from polymerized olefinic hydrocarbons of 3 to 5 carbon atoms absorbed in said solution from said gaseous mixture, the steps of regenerating said aqueous solution which comprise heating said solution to a temperature above 50° C. in the presence of an oxidizing agent selected from the group consisting of air, oxygen, ozone, hydrogen peroxide, a nitrogen oxide, a nitrogen-oxygen acid, an alkali metal permanganate, silver permanganate, silver oxide and mixtures thereof to oxidize the acetylide of said silver acetylide, to oxidize said polymer and to reduce the silver of said silver acetylide to free silver whereby said contaminants are effectively converted to oxidation and reduction products, and oxidizing said free silver to silver ions to regenerate said solution.

5. A process for regenerating an aqueous solution of a water-soluble silver salt of silver and an anion selected from the group consisting of boro-fluoride, fluorosilicate, nitrate, perchlorate, fluoride, trifluoroacetate, antimony hexafluoride, arsenic hexafluoride and mixtures thereof, which solution is contaminated with a dissolved silver acetylide selected from the group consisting of silver acetylide, silver lower alkyl acetylide, silver vinylacetylide and silver diacetylide formed by silver ions from said solution and an acetylenic impurity absorbed in said solution and contaminated with an unsaturated polymer formed from polymerized olefinic hydrocarbons of 3 to 5 carbon atoms absorbed in said solution, which process comprises heating said solution to a temperature above 100° C. to oxidize the acetylide of said silver acetylide, to oxidize said polymer and to reduce the silver of said silver acetylide to free silver whereby said contaminants are effectively converted to oxidation and reduction products, and oxidizing said free silver to silver ions to regenerate said solution.

6. A process for regenerating an aqueous solution of a water-soluble silver salt of silver and an anion selected from the group consisting of boro-fluoride, fluorosilicate, nitrate, perchlorate, fluoride, trifluoroacetate, antimony hexafluoride, arsenic hexafluoride and mixtures thereof, which solution is contaminated with a dissolved silver acetylide selected from the group consisting of silver acetylide, silver lower alkyl acetylide, silver vinylacetylide and silver diacetylide formed by silver ions from said solution and an acetylenic impurity absorbed in said solution and contaminated with an unsaturated polymer formed from polymerized olefinic hydrocarbons of 3 to 5 carbon atoms absorbed in said solution, which process comprises heating said solution to a temperature above 50° C. in the presence of an oxidizing agent selected from the group consisting of air, oxygen, ozone, hydrogen peroxide, a nitrogen oxide, a nitrogen-oxygen acid, an alkali metal permanganate, silver permanganate, silver oxide and mixtures thereof to oxidize the acetylide of said silver acetylide, to oxidize said polymer and to reduce the silver of said silver acetylide to free silver whereby said contaminants are effectively converted to oxidation and reduction products, and oxidizing said free silver to silver ions to regenerate said solution.

7. A process according to claim 1 which further comprises continuously withdrawing a portion of said contaminated solution, regenerating said withdrawn portion by the steps defined in claim 1, and recycling to the solution the portion so regenerated.

8. A process according to claim 5 which further comprises continuously withdrawing a portion of said contaminated solution, regenerating said withdrawn portion by the steps defined in claim 5, and recycling to the solution the portion so regenerated.

References Cited by the Examiner
UNITED STATES PATENTS

| | | | |
|---|---|---|---|
| 2,474,869 | 7/49 | Shaw et al. | 23—2.1 X |
| 2,483,440 | 10/49 | Shaw et al. | 23—2.1 X |

OTHER REFERENCES

Raay et al., German application, 1,027,658, printed April 10, 1958.

MAURICE A. BRINDISI, *Primary Examiner.*